Sept. 14, 1965     K. WEBER ETAL     3,205,767
PHOTOMICROGRAPHIC METHODS AND APPARATUS
Filed June 22, 1962     3 Sheets-Sheet 1

INVENTORS:
DR. KLAUS WEBER
KARL LEONHARDT
BY E. M. Squire

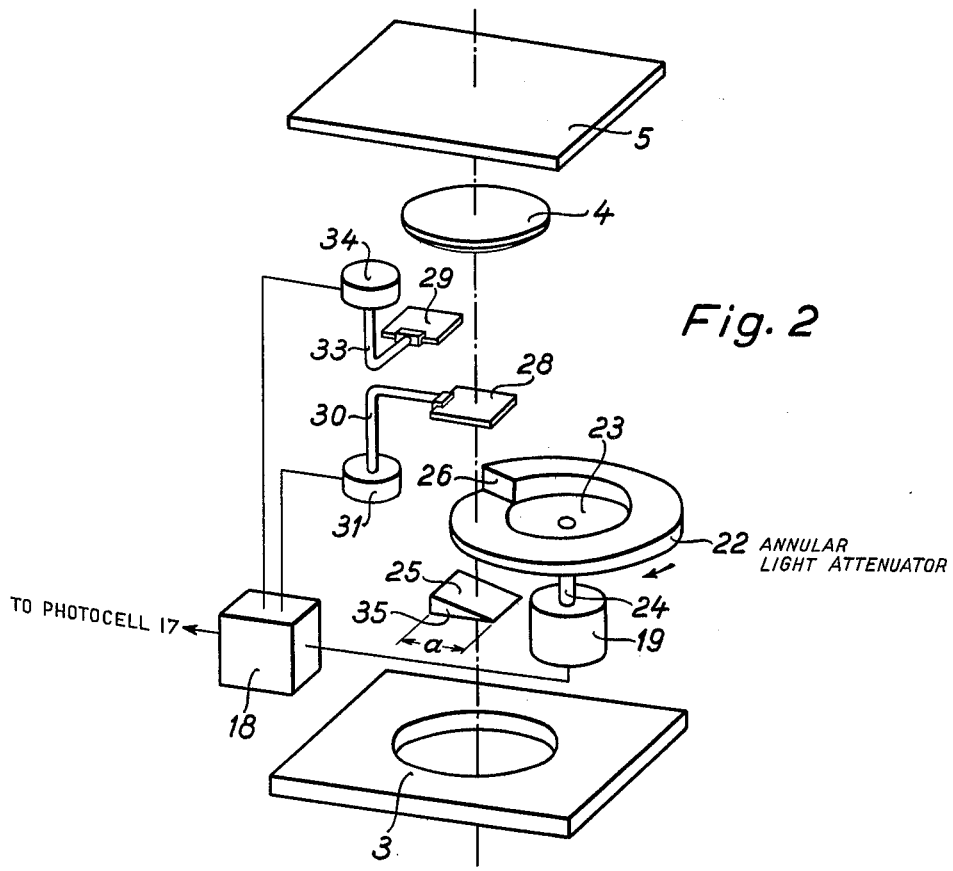
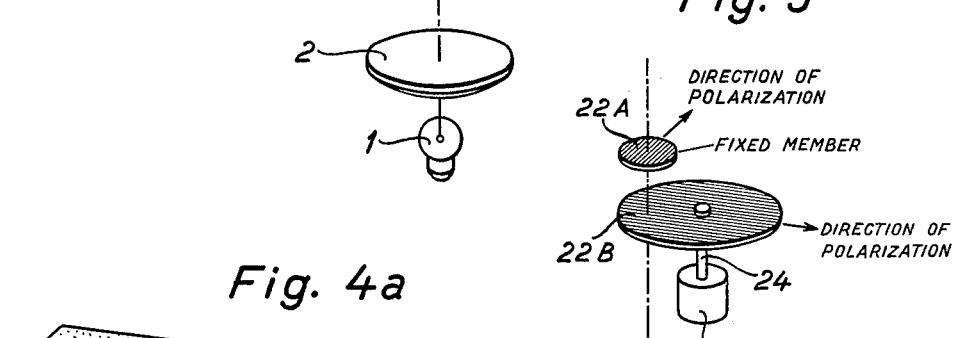
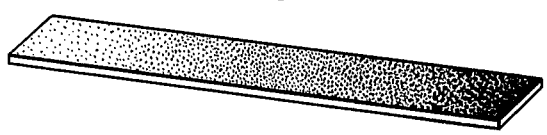

3,205,767
PHOTOMICROGRAPHIC METHODS AND
APPARATUS
Klaus Weber, Wetzlar (Lahn), and Karl Leonhardt, Greifenthal, Germany, assignors to Ernst Leitz G.m.b.H., Optische Werke, Germany, a corporation of Germany
Filed June 22, 1962, Ser. No. 204,546
Claims priority, application Germany, June 28, 1961, L 39,383
1 Claim. (Cl. 88—24)

The present invention relates to exposure control apparatus for use in photomicrography.

The photomicrographic apparatus comprises a microscope portion and a photographic portion arranged to produce a magnified photographic image of an object. The microscope portion provides a stage for supporting an object to be photographed. The photographic portion includes a shutter having a fixed exposure time for any particular combination of film sensitivity and fixed illumination level. A light source of fixed intensity is provided for illumination of the object on the microscope stage. In order to provide a desired predetermined intensity of illumination appropriate for the fixed exposure time of the shutter, a controllable and continuously variable light attenuating device is interposed in the path between the light source and the photosensitive surface upon which the image is to be produced. Conveniently, the light attenuating device may be located between the light source and the microscope stage. The level of illumination available to the photographic portion is sensed by a photosensitive control which adjusts the light attenuating device to provide the proper exposure for fixed shutter time.

The invention will be more fully understood upon reading the following specification with reference to the accompanying drawing forming a part hereof.

Referring to the drawing:

FIGURE 2 is a diagrammatic perspective view showing a modification of the lower portion of FIG. 1.

FIGURE 4a is a perspective view of a strip of photographic film of uniform thickness and continuously varying opacity which may be substituted for a tapering wedge of uniform opacity which is shown in FIG. 1.

FIGURE 5 is a fragmentary perspective view showing a light attenuator using annular polarizing members.

Figure 1:
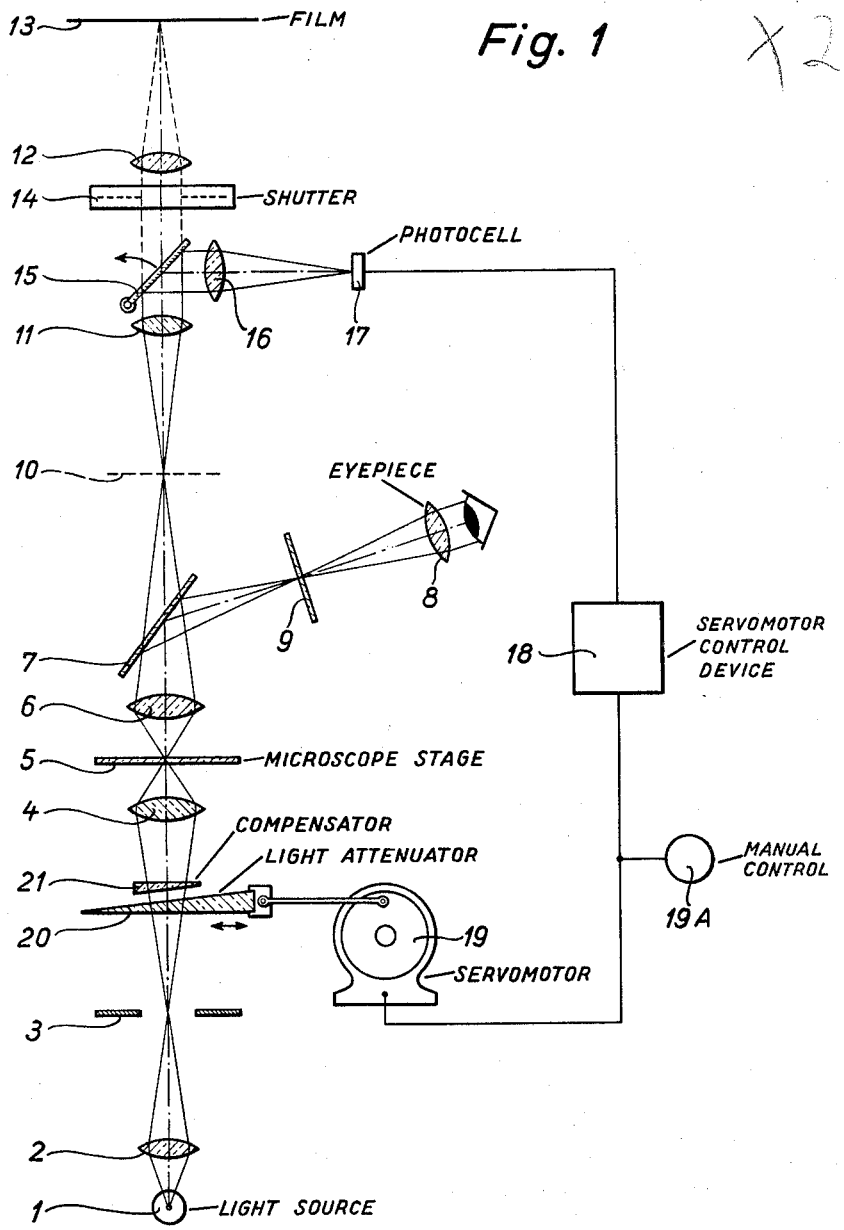
FIGURE 1 is a diagrammatic side elevational view of an embodiment of the invention.

Referring to the drawing, there is shown a conventional microscope having a light source 1, a collector lens 2, a field stop aperture 3 and a condensor lens 4 disposed beneath the microscope stage 5. For visual observation, the object is focussed by a lens 6 and reflected by a mirror 7 to an eyepiece comprising ocular lens 8. A suitably graduated reticule 9 is arranged to permit accurate positioning of the object with reference to the field of view. The mirror 7 may be opaque and movable out of the reflecting path or it may be fixed and only partially opaque so that it operates as a beam-splitter. With the mirror 7 withdrawn, if it is opaque, the light rays embodying the image of the object on the stage 5 pass through a focal plane 10 to a photographic ocular lens 11 and, during photographic exposure, through a photographic objective lens 12 to the film 13. In front of the photographic objective lens 12, there is provided a normally closed shutter 14 having an adjustably fixed exposure time. Prior to opening of the shutter 14, the light from the image to be photographed is reflected by a pivotally movable mirror 15 through an objective lens 16 to a photosensitive element 17 such as a photocell or a photoresistor. If the mirror 7 is only partially opaque and operates as a beam-splitter, it divides light from the object on the stage 5 into two portions, one portion being directed to the ocular means or lens 8 and the other portion being directed to the photocell or illumination sensing means 17. The photosensitive element 17 is connected through a suitable control device 18 to a servomotor 19. The servomotor 19 assumes a position which is determined by the intensity of illumination reaching the photosensitive element 17.

The servomotor 19 is connected to control the position of a gray wedge 20 the effective opacity of which is determined by its thickness at any particular transverse line throughout its effective length. As shown in FIG. 1, the gray control wedge 20 is formed of material of uniform opacity and is rectilinearly displaceable horizontally in either direction by the servomotor 19. A fixed equalizing wedge 21 cooperates with the movable wedge 20 and tapers in a complementary manner in the direction opposite to the taper of wedge 20 so that the attenuation of light reaching the stage 5 is uniformly distributed. Without the equalizing wedge 21, the intensity of illumination would vary uniformly throughout the field of illumination of the stage 5, being less for the thicker portions of the control wedge 20 than for the thinner portions thereof.

It will be appreciated that the light attenuating control wedge 20 and equalizing wedge 21 may be positioned at any point along the path between the light source 1 and the mirror 7 including a position between the stage 5 and the mirror 7. Moreover, the control wedge 20 and equalizing wedge 21 may be formed of material of uniform thickness and continuously varying opacity such as a suitably exposed photographic plate or film as shown in FIG. 4a.

Referring to FIG. 2, it is assumed that the control wedge 20, instead of being rectilinearly movable as shown in FIG. 1, is arranged as an annulus 22 the angular position of rotation of which, with respect to its center, is controlled by the servomotor 19. An arcuate segment of the annulus 22 is positioned in the path of light between the light source and stage 5. The annulus 22 is positioned on a central supporting hub 23 mounted at the upper end of an upright shaft 24 driven by the servomotor 19. A sector-shaped compensating wedge 25 is located below the annular control wedge 22 in the light path from the source 1 and in alignment with the sector of annulus 22 which is operatively disposed in the light path. The angular width of the compensating wedge 25 is indicated by the angle alpha.

The thickness of the annular control wedge 22 changes abruptly from maximum to minimum at a vertical surface 26. Disposed above the control wedge 22 are two supplemental light attenuating members 28 and 29 the light attenuation of each of which is uniform throughout the light beam. The amount of light attenuation caused by each of the supplemental light attenuating members 28 and 29 is equal in amount to the abrupt change in attenuation which takes place at the vertical rectangular surface 26. The supplemental member 28 is mounted at the free end of a horizontally extending arm 30 which may be selectively rotated in either direction in a horizontal plane through an angle of 90° by an actuator 31 controlled by the control device 18. The supplemental member 28 is shown in its operative position wherein it intercepts and attenuates light reaching the microscope stage 5. The supplemental member 29 is shown in its inoperative position wherein it is withdrawn from the path of light. The supplemental member 29 is mounted on an arm 33 controlled by a separate independent actuator 34 connected to the control device 18.

Figure 3:
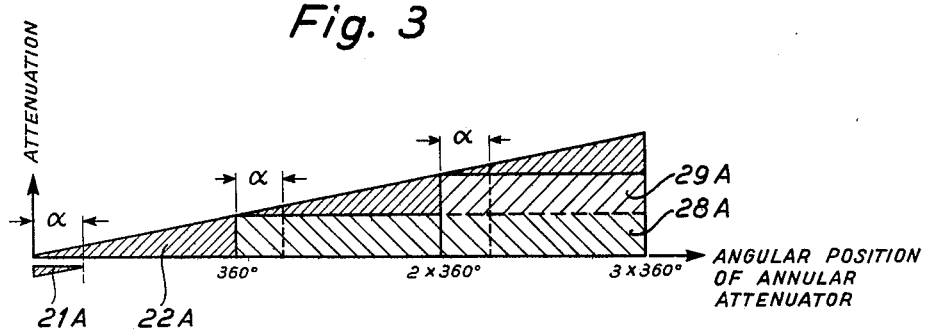
FIGURE 3 is a graph showing the light attenuation of the annular wedge member of FIG. 2 as abscissae plotted against its angular position as ordinates.

As indicated in FIG. 3, the annular control wedge 22 may rotate through three complete revolutions. At the point of transition between the first and second revolution, the supplemental filter element 28 is inserted in the path of illumination by the actuator 31 along with the control wedge 22 and the equalizing wedge 25 and produces attenuation 28A in addition to the continuously increasing attenuation 22A of the control wedge 22. The attenuation of the equalizing or compensating wedge 21 is indicated as 21A. The additional attenuation 28A is to be inserted precisely at the point where the vertical surface 26 defining the line of transition from maximum to minimum thickness of the control wedge 22 reaches the nearer edge 35 of the equalizing wedge 25. In this manner, there is no interference with the compensating effect of the equalizing wedge 25. As shown in FIGS. 2 and 3, the angular width of the equalizing wedge 21 is indicated by the angle alpha. Accordingly the first fixed step of attenuation by supplemental member 28 is to be inserted at 360° minus alpha measured from the point of minimum combined attenuation of the control wedge 22 and equalizing wedge 25. A second fixed step of attenuation 29A is to be inserted by the supplemental member 29 at 720° minus alpha. This will provide uniformly increasing attenuation through three complete revolutions of the control wedge and by analogous procedure may be extended to include more than the three complete revolutions illustratively shown in FIG. 3.

Figure 4:
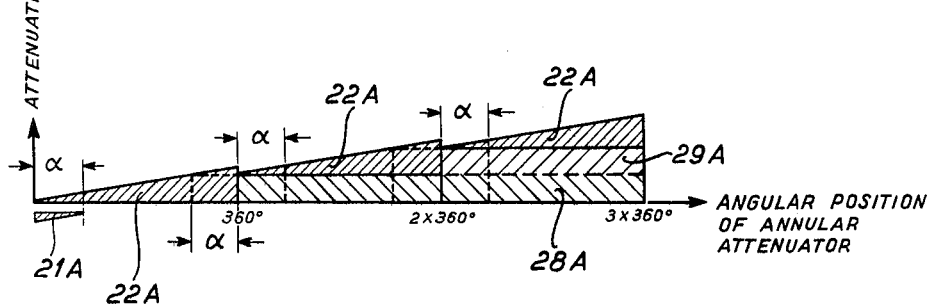
FIGURE 4 shows a modification of FIG. 3.

In FIG. 4, there is shown a graph illustrating a modified manner of operation wherein, at the end of each revolution, the servomotor 19 is caused to make a reverse angular jump through the angle alpha accompanied by the insertion or removal of a fixed step of attenuation. This action may be provided by means embodied in the servomotor control device 18, for example, and responsive to an increase in illumination when the illumination should be continuously decreasing or vice versa. The reverse jump will be caused by suitably controlling the action of servomotor 19. As indicated in FIG. 4, the changing attenuation will jump back to a previous value and then resume progress in the same direction.

In operation, the object to be observed is placed on the stage 5 and viewed through the eyepiece 8. When it is properly positioned and ready to be photographed, the mirror 7 is swung out of the light path, unless it is a fixed partially opaque mirror. With the mirror 15 in its operative position, as shown in FIG. 1, the photocell-servomotor system 17, 18, 19 displaces the control wedge 20 to obtain a predetermined level of illumination at the photocell 17. The fixed shutter speed of shutter 14 has been previously adjusted with reference to the film speed or sensitivity to produce a proper exposure for this predetermined level of illumination on the photocell 17. When the servomotor 19 has come to rest at its proper position, the mirror 15 is swung out of the path of light and the shutter is actuated to provide the predetermined fixed period of exposure.

In the arrangement of FIG. 2, a wider range of illumination variation is obtainable for the same opacity of the control wedge. Alternately, the control wedge 22 may be made less opaque so that a more precise adjustment of the illumination level becomes possible. It will be observed that the illumination level adjustment is operative with respect to the eyepiece 8 so that it is effective for visual observation. If the illumination level provided by the light source 1 is too low, even with the attenuation at a minimum, a flash bulb may be substituted for the light source 1 during the actual exposure. Control device 18 is adjusted in accordance with the anticipated light output of the flash bulb and the film sensitivity so that the servomotor 19 makes the correct attenuation adjustment for the flash with the shutter 14 wide open. This adjustment is made using the light source 1 for which the flash bulb is thereafter substituted. The opening of the shutter 14 is synchronized in the usual manner with the firing of the flash bulb.

The controllable light attenuation is also useful during visual observation through the eyepiece 8 because the illumination level remains suitably adjusted for large differences between the opacities of different specimens placed on the stage 5. Moreover, the servomotor 19 or the control device 18 may be provided with a manual control 19A for use during visual observation. When in use, the manual control 19A supersedes the photocell 17.

The wedge 22 of FIG. 2 may be replaced by two superposed annuli 22A and 22B formed of light polarizing material. When the axes of polarization of the two annuli are parallel, the light attentuation will be minimum. By holding one annulus 22A stationary and connecting the center of the other annulus 22B to the upright shaft 24 for rotation by the servomotor 19, the axes of polarization may be gradually rendered mutually perpendicular for maximum attenuation. Since the direction of polarization is uniformly maintained throughout each individual annulus, the amount of attenuation is uniform transversely throughout the light path and no equalization member such as the compensating wedge 25 is required.

In practice, it has been found to be advantageous to utilize a shutter speed of 1/25 second for specimens which are fairly translucent. For the more opaque specimens, a shutter speed of 1 second has been found to give good results. With either speed for the shutter 14, automatic adjustments are made by the servomotor 19 to provide the proper illumination of the photosensitive surface of the film 13 during the period of exposure.

While we have shown what we believe to be the best embodiments of our invention, it will be apparent to those skilled in the art that various changes and modifications may be made therein without departing from the spirit and scope of the invention as defined in the appended claim.

What is claimed is:

Photomicrographic apparatus comprising, in combination: microscope means including stage means for supporting an object to be photographed; utilization means for using an image of said object magnified by said microscope means; a light source for illuminating an object when said object is supported on said stage means; rotatable annular light attenuating means having a segment thereof interposed in the path of light between said light source and said stage means, the opacity of said peripheral portion varying continuously throughout its arcuate length through an angle of 360°; compensating means of opacity which varies oppositely to the opacity of said peripheral portion interposed in said path in alignment with said segment for producing an attenuation which is uniform throughout the cross-sectional area of said path; and at least one light attenuating member removably interposed in said path in alignment with said peripheral portion and said compensating means, the opacity of said attenuating member being substantially equal to the maximum opacity provided by the combined opacities of said peripheral portion and said compensating means.

References Cited by the Examiner
UNITED STATES PATENTS

| | | | |
|---|---|---|---|
| 1,213,485 | 1/17 | Herz. | |
| 1,954,338 | 4/34 | Tuttle et al. | |
| 2,152,513 | 3/39 | West | 88—40 |
| 2,404,888 | 7/46 | Richards | 88—40 |
| 2,464,162 | 3/49 | Tuttle et al. | |
| 2,893,289 | 7/59 | Edgerton | 88—40 |
| 2,910,913 | 11/59 | Michel | 88—24 X |
| 2,952,188 | 9/60 | Bang | 88—24 X |
| 3,106,129 | 10/63 | Frenk et al. | 88—24 |
| 3,130,634 | 4/64 | Kropp et al. | 88—24 |

FOREIGN PATENTS

| | | |
|---|---|---|
| 195,249 | 1/58 | Austria. |
| 782,422 | 9/57 | Great Britain. |

NORTON ANSHER, *Primary Examiner.*

EMIL G. ANDERSON, *Examiner.*